United States Patent
Soejima

(10) Patent No.: US 11,474,082 B2
(45) Date of Patent: Oct. 18, 2022

(54) DIAGNOSIS DEVICE

(71) Applicant: SUBARU CORPORATION, Tokyo (JP)

(72) Inventor: Hideki Soejima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 754 days.

(21) Appl. No.: 16/373,920

(22) Filed: Apr. 3, 2019

(65) Prior Publication Data

US 2019/0310232 A1 Oct. 10, 2019

(30) Foreign Application Priority Data

Apr. 9, 2018 (JP) .............................. JP2018-074549

(51) Int. Cl.
*G01N 29/44* (2006.01)
*G01H 9/00* (2006.01)
*G01N 29/04* (2006.01)
*G07C 3/14* (2006.01)
*G01M 11/08* (2006.01)
*G01M 5/00* (2006.01)
*G01K 11/32* (2021.01)

(52) U.S. Cl.
CPC ......... *G01N 29/4427* (2013.01); *G01H 9/004* (2013.01); *G01M 5/0066* (2013.01); *G01M 11/085* (2013.01); *G01N 29/04* (2013.01); *G07C 3/14* (2013.01); *G01K 11/32* (2013.01); *G01N 2291/0289* (2013.01)

(58) Field of Classification Search
CPC ..... G01H 9/004; G01K 11/32; G01M 11/085; G01M 5/0066; G01N 2291/0289; G01N 29/04; G01N 29/4427; G07C 3/14
See application file for complete search history.

(56) References Cited

U.S. PATENT DOCUMENTS

| 9,233,763 | B1 | 1/2016 | Chen |
| 9,664,609 | B2 | 5/2017 | Magne et al. |
| 2005/0067559 | A1 | 3/2005 | Ogisu et al. |
| 2011/0035088 | A1 | 2/2011 | White |

(Continued)

FOREIGN PATENT DOCUMENTS

| JP | 2005-098921 A | 4/2005 |
| JP | 2007-040713 A | 2/2007 |

(Continued)

OTHER PUBLICATIONS

Extended European Search Report for EP Patent Application No. 19166542.1 dated Jul. 23, 2019 (7 pages).

(Continued)

*Primary Examiner* — Roy Y Yi
*Assistant Examiner* — Geoffrey T Evans
(74) *Attorney, Agent, or Firm* — Smith, Gambrell & Russell, LLP

(57) ABSTRACT

A diagnosis device includes a data acquirer, a data recorder, and a health diagnoser. The data acquirer acquires a measurement data of a structure at a predetermined timing. The data recorder causes a storage to store the measurement data acquired by the data acquirer as a standard data. The health diagnoser diagnoses a health of the structure by comparing the measurement data that is acquired by the data acquirer this time with the standard data that has been acquired by the data acquirer last time and stored in the storage.

4 Claims, 6 Drawing Sheets

(56) References Cited

U.S. PATENT DOCUMENTS

| | | | |
|---|---|---|---|
| 2016/0116366 A1 | 4/2016 | Da Silva et al. |
| 2017/0370786 A1 | 12/2017 | Mastrianni et al. |
| 2019/0171199 A1 | 6/2019 | Unuma et al. |

FOREIGN PATENT DOCUMENTS

| | | | |
|---|---|---|---|
| JP | 2008-107198 A | 5/2008 |
| JP | 2009/210511 A | 9/2009 |
| JP | 2009-229070 A | 10/2009 |
| JP | 2010-025810 | 2/2010 |
| JP | 2011-247700 A | 12/2011 |
| JP | 5629318 B2 | 11/2014 |
| JP | 2015-230206 A | 12/2015 |
| JP | 2017-089102 A | 5/2017 |
| WO | 2018/042616 A1 | 3/2018 |

OTHER PUBLICATIONS

Japanese Office Action dated Sep. 15, 2020 for Japanese Patent Application No. 2018/074549 (3 pages with provided translation).
European Office Action dated Sep. 29, 2021 in European Patent Application No. 19 166 542.1 (4 pages).
Office Action for Japanese Patent Application No. 2018-074549 dated Mar. 10, 2020 (3 pages with machine translation).
Japanese Office Action dated May 31, 2022 in Japanese Patent Application No. 2021-069200 (2 pages in Japanese with English translation).

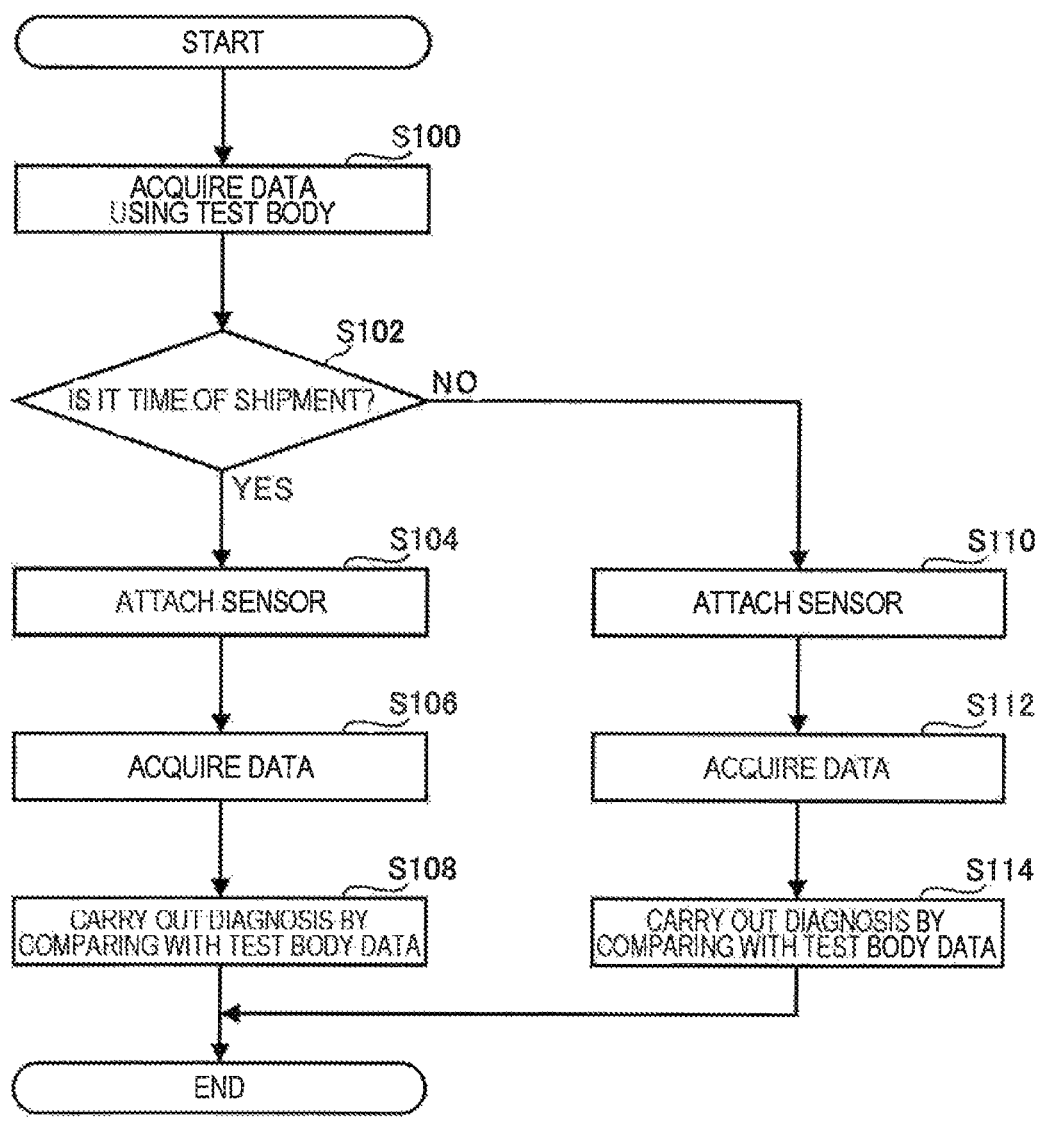

DIAGNOSIS DEVICE

CROSS-REFERENCE TO RELATED APPLICATIONS

The present application claims priority from Japanese Patent Application No. 2018-074549 filed on Apr. 9, 2018, the entire contents of which are hereby incorporated by reference.

BACKGROUND

The disclosure relates to a diagnosis device.

Structural health diagnosis has been known as a method for diagnosing a structure. In the structural health diagnosis, a sensor and a vibrator are attached to a test body that is imitated from a structure, and the sensor acquires, as standard data, a physical quantity such as distortion of the test body based on vibration generated by the vibrator. The structure is a diagnosis target, and the test body is created as a different object from the structure.

Subsequently, a sensor and a vibrator are attached to the structure, and the sensor acquires a physical quantity such as distortion of the structure based on vibration generated by the vibrator at each predetermined timing. In addition, the health (such as presence/absence of aging degradation, damage, or defect) of the structure is diagnosed by comparing the acquired physical quantity with the standard data (physical quantity) acquired from the test body.

SUMMARY

An aspect of the disclosure provides a diagnosis device including: a storage; a data acquirer configured to acquire a measurement data of a structure at a predetermined timing; a data recorder configured to cause a storage to store the measurement data acquired by the data acquirer as a standard data; and a health diagnoser configured to diagnose a health of the structure by comparing the measurement data that is acquired by the data acquirer this time with the standard data that has been acquired by the data acquirer last time and stored in the storage.

An aspect of the disclosure provides a diagnosis device including a storage and circuitry. The circuitry is configured to acquire a measurement data of a structure at a predetermined timing. The circuitry is configured to cause the storage to store the measurement data acquired by the data acquirer as a standard data. The circuitry is configured to diagnose a health of the structure by comparing the measurement data that is acquired by the data acquirer this time with the standard data that has been acquired by the data acquirer last time and stored in the storage.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 3 is a flowchart illustrating procedure of structural health diagnosis according to a comparative example;

DETAILED DESCRIPTION

Figure 1:
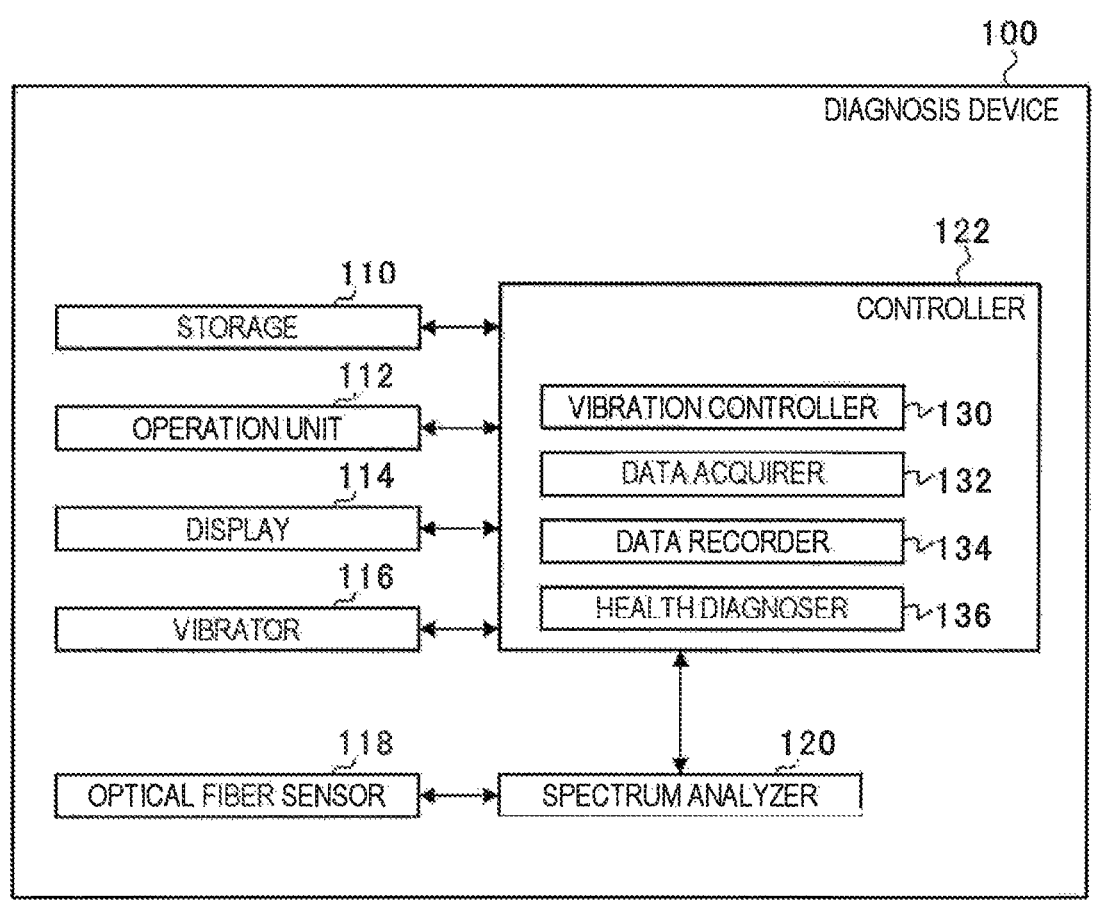
FIG. 1 is a block diagram illustrating a configuration of a diagnosis device.

In the following, some preferred but non-limiting embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

According to the above-described structural health diagnosis, it is necessary to separately create the test body in the case of acquiring the standard data. This is because it is impossible to intentionally damage or deface an actual structure. In addition, in the case of acquiring the standard data, it is necessary to age and degrade the test body and acquire a physical quantity for each predetermined time period for diagnosing the aging degradation. In addition, it is also necessary to damage or deface a test body in advance and acquire a physical quantity of the damaged or defaced test body.

As described above, the structural health diagnosis needs a huge time and cost to acquire standard data. Accordingly, there is a problem that the structural health diagnosis is not easily carried out.

It is desirable to provide a diagnosis device that makes it possible to easily carry out the structural health diagnosis.

FIG. 1 is a block diagram illustrating a configuration of the diagnosis device 100. As illustrated in FIG. 1, the diagnosis device 100 includes a storage 110, an operation unit 112, a display 114, a vibrator 116, an optical fiber sensor 118, a spectrum analyzer 120, and a controller 122.

The storage 110 is implemented as RAM, flash memory, an HDD, or the like. The storage 110 stores standard data (to be described later). For instance, the operation unit 112 is implemented as a keyboard or a touchscreen that is superimposed on the display 114. The operation unit 112 receives operation input from a user. The display 114 is implemented as a liquid crystal display, an organic electro-luminescence (EL) display, or the like.

For instance, the vibrator 116 is implemented as piezoelectric elements (piezo elements).

Figure 2A:
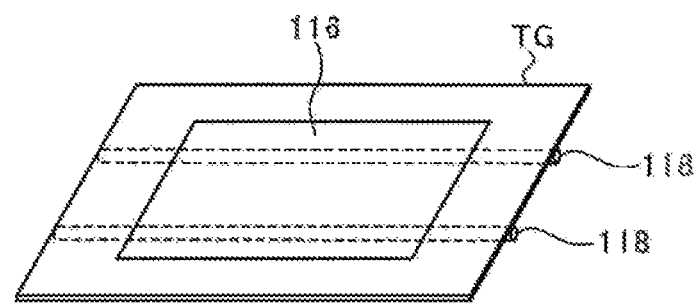
FIGS. 2A and 2B are explanatory diagrams of a vibrator and optical fiber sensors.
Figure 2B:
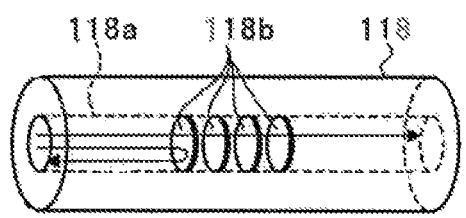

FIGS. 2A and 2B are explanatory diagrams illustrating the vibrator 116 and the optical fiber sensors 118. FIG. 2A illustrates a structure TG to which the vibrator 116 and the optical fiber sensors 118 are attached. FIG. 2B illustrates an internal configuration of the optical fiber sensor 118.

For instance, the structure TG is a part or all of an aircraft, a building, or the like. The vibrators 116 and the optical fiber sensors 118 are attached to portions of the structure TG. Here, a plate-like structure TG is taken as an instance. However, the shape of the structure TG is not limited thereto. The vibrators 116 and the optical fiber sensors 118 are attached to the structure TG in an appropriate manner based on the shape of the structure TG.

The piezoelectric elements of the vibrator 116 are coupled to conducting wire (not illustrated). When voltage is applied to a piezoelectric element via the conducting wire, the thickness of the piezoelectric element changes due to the piezoelectric effect. When pulse voltage is applied to any piezoelectric element among the piezoelectric elements, a part near the piezoelectric element to which the voltage is applied gets vibrated in the structure TG In such a way, the vibrator 116 vibrates the structure TG.

For instance, the optical fiber sensor 118 is intrinsic. In other words, in the optical fiber sensor 118, the optical fiber itself functions as a sensor element. However, the optical fiber sensor 118 may be an extrinsic optical fiber sensor that causes the optical fiber to function only as an optical transmission line to/from another sensor element. For instance, the optical fiber sensor 118 is bonded to the structure TG with adhesive.

As illustrated in FIG. 2B, a core 118a is installed in the inside of a coating or cladding of the optical fiber sensor 118. Light passes through the core 118a. Light transmitting trough the core 118a toward an outside is reflected by the cladding and returned to the core 118a.

In the core 118a, grating members 118b are installed apart from each other in the axis direction of the optical fiber. The grating members 118b have different refractive indices from the other parts of the core 118a. The grating members 118b cause the refractive indices to change periodically (fiber Bragg grating (FBG)).

In the grating members 118b, broadband spectrum light interferes with a specific wavelength called Bragg wavelength in a direction in which they strengthen each other. In such a way, the grating members 118b reflects only a specific wavelength component in the broadband spectrum light. Light of the other wavelength passes through the grating members 118b.

The wavelength of reflected light is changed when disturbance is added to the grating members 118b. The disturbance added to the grating members 118b is measured by measuring the change in the wavelength of the reflected light.

With reference to FIG. 1 again, the spectrum analyzer 120 is coupled to the optical fiber sensors 118. The spectrum analyzer 120 includes a light source and a light receiver. The light source emits broad spectrum light, and the broad spectrum light reaches the optical fiber sensors 118. As described above, the optical fiber sensor 118 reflects a part of the light. The light receiver of the spectrum analyzer 120 receives the reflected light.

The spectrum analyzer 120 detects the wavelength of the reflected light received by the light receiver. The wavelength detected by the spectrum analyzer 120 is converted from analog to digital by an A/D converter (not illustrated), and output to the controller 122.

The controller 122 manages and controls the whole diagnosis device 100 by using a semiconductor integrated circuit including a central processing unit (CPU), ROM having a program or the like stored therein, RAM that functions as a work area, and the like. In addition, the controller 122 also functions as a vibration controller 130, a data acquirer 132, a data recorder 134, and a health diagnoser 136.

The vibration controller 130 applies voltage to the vibrator 116 and causes the vibrator 116 to generate vibration of the structure TG (to vibrate the structure TG).

The data acquirer 132 carries out measurement by using the optical fiber sensors 118. As described above, the data acquirer 132 causes the spectrum analyzer 120 to emit the broad spectrum light and detect the wavelength of reflected light. The data acquirer 132 uses the wavelength of the reflected light to measure change in the structure TG that is a cause of the disturbance added to the grating members 118b.

For instance, with regard to the optical fiber sensor 118, a physical quantity is set in advance. The physical quantity is a target of measurement such as distortion (stress) or temperature of the structure TG In other words, an optical fiber sensor 118 for measuring distortion, an optical fiber sensor 118 for measuring temperature, and the like are installed.

The data acquirer 132 measures the amount of distortion of the structure TG by using reflected light from the optical fiber sensor 118 for measuring distortion. In addition, the data acquirer 132 measures temperature of the structure TG by using reflected light from the optical fiber sensor 118 for measuring temperature.

In addition, the data acquirer 132 may measure the amount of distortion of the structure TG by using reflected light from the optical fiber sensor 118 for measuring distortion while the vibration controller 130 is controlling the vibrator 116 and the vibrator 116 is vibrating the structure TG If there is a defect in the structure TG between the piezoelectric elements of the vibrator 116 and the optical fiber sensors 118, different amount of distortion is measured in comparison with a case where there is no defect. In such a way, it is possible to detect defects in the structure TG.

Accordingly, the data acquirer 132 acquires, as measurement data, the physical quantity of the structure TG by using the optical fiber sensors 118. The data recorder 134 causes the storage 110 to store the measurement data acquired by the data acquirer 132 as standard data in association with acquisition date and time.

The health diagnoser 136 carries out a health diagnosis process of diagnosing health of the structure TG by comparing the measurement data that is acquired by the data acquirer 132 with the standard data that has been stored in the storage 110. In the health diagnosis process, the health may be calculated as a low evaluation value when damage or defect of the structure TG is detected or when the amount of distortion or temperature shows an abnormal value.

In addition, the health diagnoser 136 causes the display 114 to display a result of the health diagnosis process. Depending on a result of the health diagnosis process, a worker does maintenance such as inspection or replacement of a part.

FIG. 3 is a diagram illustrating procedure of structural health diagnosis according to a comparative example. First, in the structural health diagnosis according to the comparative example illustrated in FIG. 3, a test body that is imitated from a structure TG is created as a different object from the structure TG, and standard data is acquired by using the created test body (Step S100). Specifically, the test body that is imitated from the structure TG is created, the structure TG being a target of the health diagnosis. This is because it is impossible to intentionally damage the actual structure TG.

Next, the vibrator 116 and the optical fiber sensor 118 are attached to the test body. Note that, positions where the vibrator 116 and the optical fiber sensor 118 are attached are positions that are identical to or that are deemed to be identical to positions on the structure TG where the vibrator 116 and the optical fiber sensor 118 are attached. Subsequently, the data acquirer 132 acquires, from the optical fiber sensor 118, measurement data of the structure TG vibrated by the vibrator 116.

The data recorder 134 causes the storage 110 to store the measurement data as standard data. At this time, as the measurement data, measurement data that is obtained in the case where the test body is aged and degraded and measurement data that is obtained in the case where possible damage and defect are caused to the test body are acquired. In other words, in Step S100, the test body is aged and degraded, measurement data is acquired for each predetermined time period, and the measurement data is stored as standard data in association with acquisition date and time. In addition, measurement data is also acquired after the test body is damaged or defaced, and then the measurement data is stored as standard data.

Next, when a product (such as an aircraft) including the structure TG is created (shipped) (YES in Step S102), the vibrator 116 and the optical fiber sensor 118 are attached to the structure TG (Step S104). Subsequently, the data acquirer 132 uses the vibrator 116 and the optical fiber sensor 118 to acquire measurement data (Step S106).

Next, the health diagnoser 136 diagnoses health of the structure TG by comparing the measurement data acquired in Step S106 with the standard data (Step S108).

Alternatively, the vibrator 116 and the optical fiber sensor 118 are attached to the structure TG (S110) for each predetermined time period (Such as every 3 months) or at a predetermined timing such as a part replacement timing (NO in Step S102). Subsequently, the data acquirer 132 uses the vibrator 116 and the optical fiber sensor 118 to acquire measurement data (Step S112).

Next, the health diagnoser 136 diagnoses health of the structure TG by comparing the measurement data acquired in Step S112 with the standard data (Step S114).

Figure 4:
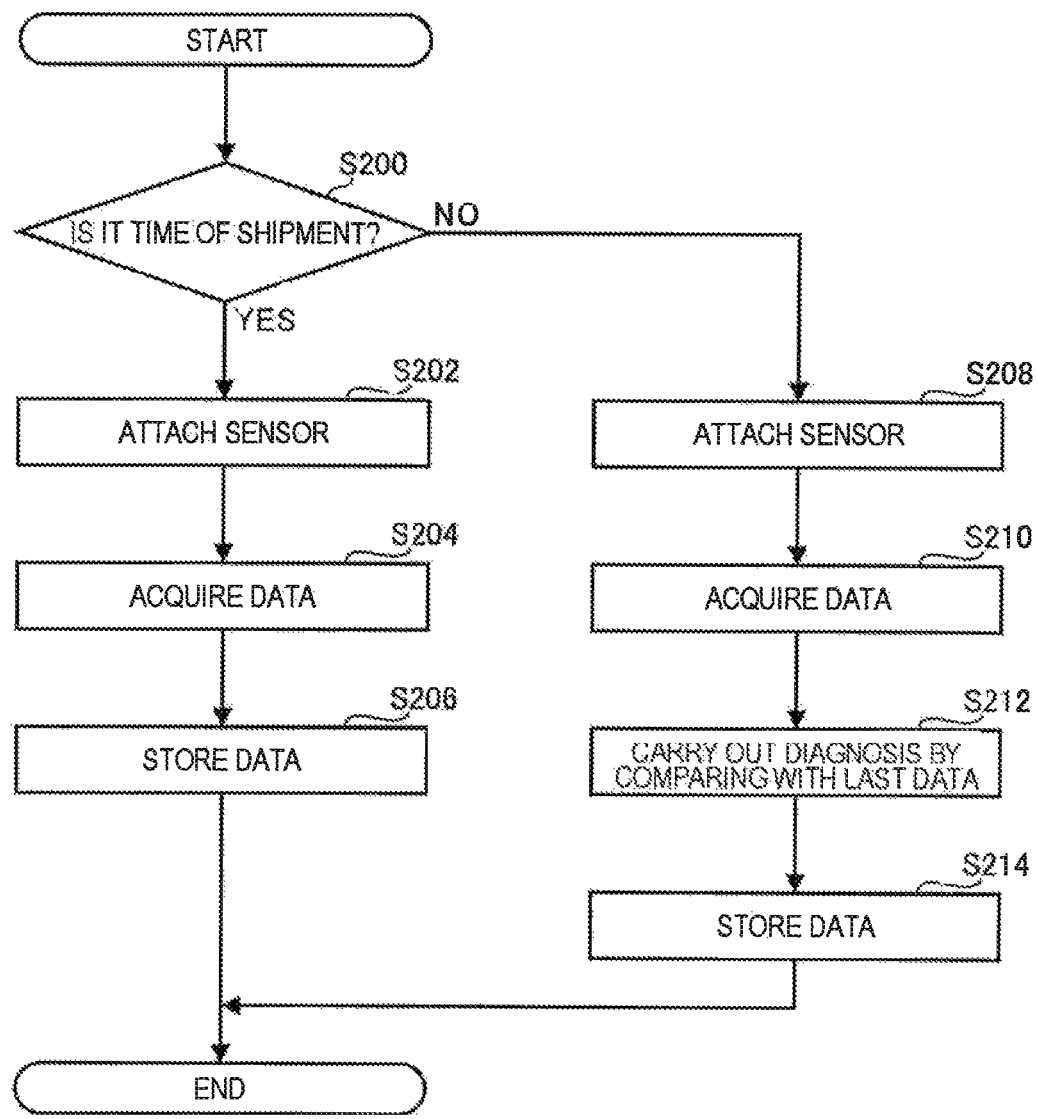
FIG. 4 is a flowchart illustrating procedure of structural health diagnosis according to an embodiment.

FIG. 4 is a diagram illustrating procedure of structural health diagnosis according to the present embodiment. In the above-described structural health diagnosis according to the comparative example, standard data is acquired by using a test body. Therefore, the amount of the standard data becomes huge, and a huge time and cost are necessary. Accordingly, it is difficult to easily carry out the structural health diagnosis.

Therefore, in structural health diagnosis according to the present embodiment, it is not necessary to create a test body, and the data acquirer 132 does not acquire standard data using the test body, as illustrated in FIG. 4. In addition, when a product (such as an aircraft) including the structure TG is created (shipped) (YES in Step S200), the vibrator 116 and the optical fiber sensor 118 are attached to the structure TG (Step S202). The data acquirer 132 uses the vibrator 116 to acquire measurement data from the optical fiber sensor 118 (Step S204).

Here, it is preliminarily validated that the structure TG is not aged, degraded, damaged, or defaced when the product including the structure TG is created. Therefore, it is assumed that the structure TG does not have such abnormalities. Accordingly, the data recorder 134 causes the storage 110 to store the physical quantity derived in Step S200 as initial standard data (Step S206).

Subsequently, the vibrator 116 and the optical fiber sensor 118 are attached to the structure TG (Step S208) for each predetermined time period (Such as every 3 months) or at a predetermined timing such as a part replacement timing (NO in Step S200). Subsequently, the data acquirer 132 uses the vibrator 116 and the optical fiber sensor 118 to acquire measurement data (Step S210).

Next, the health diagnoser 136 diagnoses health of the structure TG by comparing the measurement data acquired in Step S210 with the standard data stored in the storage 110 (Step S212). Subsequently, the data recorder 134 writes the measurement data derived in step S210 over past data in the storage 110 and stores the measurement data in the storage 110 as new standard data (Step S214).

Accordingly, in Step S210, measurement data obtained at the time of shipment is stored in the storage 110 as standard data in the case where the structural health diagnosis is performed for the first time after the shipment. Subsequently, the health diagnosis is carried out by comparing the measurement data acquired in Step S210 with the standard data obtained at the time of shipment.

In addition, for instance, in the case where the structural health diagnosis is carried out for the second time after the shipment, measurement data acquired for the first time after the shipment has already been stored in the storage 110 as the standard data. Accordingly, the health diagnosis process is carried out by comparing the measurement data acquired in Step S210 with the measurement data (standard data) acquired for the first time after shipment.

In other words, by using the structural health diagnosis according to the present embodiment, it is possible to determine whether the structure TG has any abnormality such as damage or defect by comparing measurement data acquired this time with measurement data (standard data) acquired last time. Note that, in the health diagnosis according to the present embodiment, it is impossible to diagnose aging degradation of the structure TG However, it is determined that the structure TG has abnormality such as damage or defect in the case where a difference between measurement data acquired this time and measurement data acquired last time is greater than a difference that is assumed to be generated due to aging degradation.

As described above, the diagnosis device 100 according to the present embodiment does not have to acquire standard data in advance by using a test body. Therefore, it is possible to reduce the amount of data, cost, and time. Accordingly, it is possible to easily carry out the structural health diagnosis.

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

For instance, the fiber Bragg grating optical fiber sensor 118 has been used as an instance in the above-described embodiment. However, a sensor for measuring measurement data is not limited to the optical fiber sensor 118. Another sensor may be used as the sensor for measuring measurement data.

In addition, the diagnosis device 100 including the vibrator 116 has been described in the above-described embodiment. However, the vibrator 116 is not an essential structural element although the vibrator 116 makes it possible to detect defects in the health diagnosis process.

In addition, in the above-described embodiment, the vibrator 116 and the optical fiber sensor 118 are attached to the structure TG for each diagnosis. However, one or both of the vibrator 116 and the optical fiber sensor 118 may be kept attached on the structure TG.

In addition, according to the above-described embodiment, it is possible to determine whether the structure TG has any abnormality such as damage or defect by comparing measurement data acquired this time with measurement data (standard data) acquired last time. However, it is also possible to determine whether the structure TG has any abnormality such as damage or defect by comparing measurement data acquired this time with pieces of measurement data (standard data) acquired last time or before that.

Figure 5:
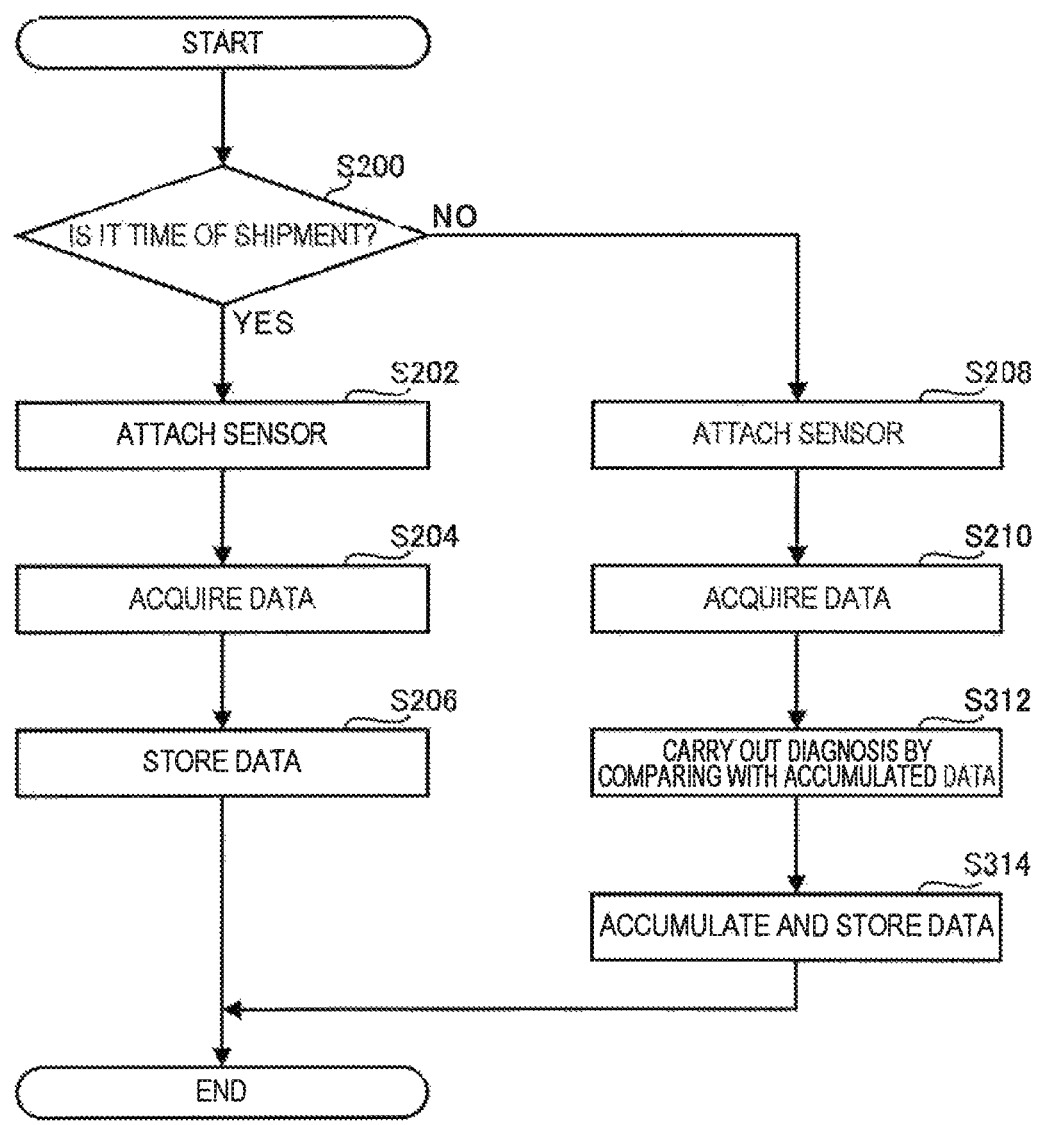
FIG. 5 is a flowchart illustrating procedure of structural health diagnosis according to a modified embodiment.

FIG. 5 is a diagram illustrating procedure of structural health diagnosis according to a modified embodiment. Note that, processes similar to FIG. 4 are denoted with the same reference signs, and description thereof will be omitted here. The health diagnosis according to the modified embodiment illustrated in FIG. 5 includes processes of Step S312 and Step S314 instead of the process of Step S212 and Step S214 in the structural health diagnosis illustrated in FIG. 4.

In Step S312, the health diagnoser 136 diagnoses health of the structure TG by comparing the measurement data acquired in Step S210 with all the standard data accumulated and stored in the storage 110. In addition, in Step S314, the data recorder 134 newly stores the measurement data acquired in Step S210 in accordance with time and date, without overwriting the measurement data (standard data) that has been stored in the storage 110 in the past. In other words, in Step S314, the measurement data acquired in Step S204 and the measurement data acquired in Step S210 are accumulated and stored in the storage 110 as standard data.

In such a way, it is possible to compare measurement data acquired this time with one or more pieces of measurement data (standard data) acquired last time or before that, in the health diagnosis process in Step S312. Therefore, it is possible to improve accuracy of the diagnosis.

The invention claimed is:

1. A diagnosis device comprising:
a storage;
a data acquirer configured to acquire a measurement data of a structure at a predetermined timing;
a data recorder configured to cause the storage to store the measurement data acquired by the data acquirer as a standard data; and
a health diagnoser configured to diagnose a health of the structure by comparing the measurement data that is acquired by the data acquirer this time with the standard data that has been acquired by the data acquirer last time and stored in the storage, and wherein
the data acquirer acquires no measurement data of a test body that is imitated from the structure.

2. The diagnosis device according to claim 1, wherein
the data recorder causes the storage to accumulate and store the measurement data as the standard data each time the data acquirer acquires the measurement data, and
the health diagnoser compares the measurement data that is acquired by the data acquirer this time with all the standard data that has been accumulated and stored in the storage.

3. A diagnosis device comprising:
a storage;
circuitry configured to
acquire a measurement data of a structure at a predetermined timing,
cause the storage to store the measurement data acquired by the data acquirer as a standard data, and
diagnose a health of the structure by comparing the measurement data that is acquired by the data acquirer this time with the standard data that has been acquired by the data acquirer last time and stored in the storage, and wherein
the circuitry configured to acquire data acquires no measurement data of a test body that is imitated from the structure.

4. The diagnosis device according to claim 3, wherein
the circuitry is configured to cause the storage to accumulate and store the measurement data as the standard data each time the circuitry acquires the measurement data, and
wherein the circuitry is further configured to compare the measurement data that is acquired by this time with all the standard data that has been accumulated and stored in the storage.

* * * * *